United States Patent
Kim et al.

(10) Patent No.: US 9,558,769 B1
(45) Date of Patent: Jan. 31, 2017

(54) ANTI-REFLECTION WAVEGUIDE FOR HEAT-ASSISTED MAGNETIC RECORDING

(71) Applicant: HGST Netherlands B.V., Amsterdam (NL)

(72) Inventors: Seheon Kim, San Jose, CA (US); Takuya Matsumoto, Sunnyvale, CA (US); Shen Ren, Union City, CA (US); Barry C. Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/871,648

(22) Filed: Sep. 30, 2015

(51) Int. Cl.
*G11B 11/00* (2006.01)
*G11B 5/48* (2006.01)
*G11B 5/55* (2006.01)
G11B 5/00 (2006.01)
G11B 11/105 (2006.01)
G11B 5/60 (2006.01)
G11B 5/31 (2006.01)

(52) U.S. Cl.
CPC ......... *G11B 5/4866* (2013.01); *G11B 5/5526* (2013.01); *G11B 5/314* (2013.01); *G11B 5/6088* (2013.01); *G11B 11/10532* (2013.01); *G11B 11/10543* (2013.01); *G11B 11/10554* (2013.01); *G11B 2005/0021* (2013.01)

(58) Field of Classification Search
None
See application file for complete search history.

(56) References Cited

U.S. PATENT DOCUMENTS

| | | |
|---|---|---|
| 6,999,384 B2 | 2/2006 | Stancil et al. |
| 8,577,193 B2 | 11/2013 | Zhou |
| 8,619,514 B1 * | 12/2013 | Matsumoto ............ G11B 5/314 369/13.33 |
| 8,619,516 B1 | 12/2013 | Matsumoto |
| 8,705,325 B2 | 4/2014 | Matsumoto |
| 8,705,327 B2 | 4/2014 | Matsumoto |
| 8,842,507 B1 | 9/2014 | Hirano et al. |
| 8,861,124 B1 | 10/2014 | Finot et al. |
| 8,861,317 B1 | 10/2014 | Yan et al. |
| 8,873,352 B1 | 10/2014 | Jandric et al. |
| 9,047,926 B2 | 6/2015 | Contreras et al. |
| 2007/0110379 A1 * | 5/2007 | West ................. G02B 6/1228 385/129 |
| 2007/0242921 A1 * | 10/2007 | Matsumoto ............ B82Y 20/00 385/33 |
| 2011/0216635 A1 * | 9/2011 | Matsumoto ............ G11B 5/105 369/13.33 |
| 2013/0279310 A1 | 10/2013 | Zhong et al. |
| 2015/0036468 A1 | 2/2015 | Boone, Jr. |
| 2015/0109892 A1 | 4/2015 | Contreras et al. |
| 2015/0302874 A1 * | 10/2015 | Asselin ................ G11B 5/6088 369/13.33 |

* cited by examiner

*Primary Examiner* — Tan X Dinh
(74) *Attorney, Agent, or Firm* — Zilka-Kotab, PC

(57) ABSTRACT

A system, according to one embodiment, includes a magnetic head having: a near field transducer, an optical waveguide for illumination of the near field transducer, and an anti-reflection block positioned along the optical waveguide farther from a media facing side of the magnetic head than the near field transducer. The anti-reflection block is positioned a distance from the near field transducer to destructively interfere with light reflected away from the near field transducer. Other systems, methods, and computer program products are described in additional embodiments.

20 Claims, 11 Drawing Sheets

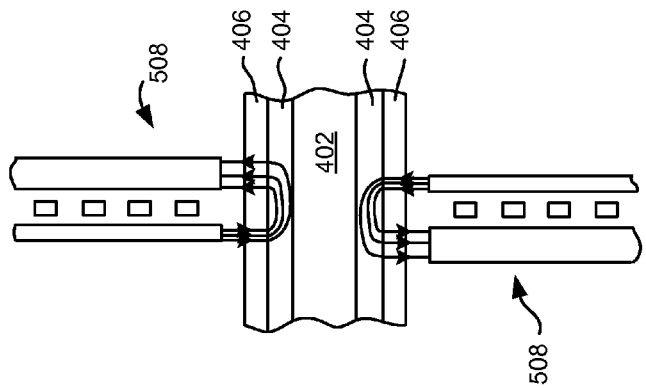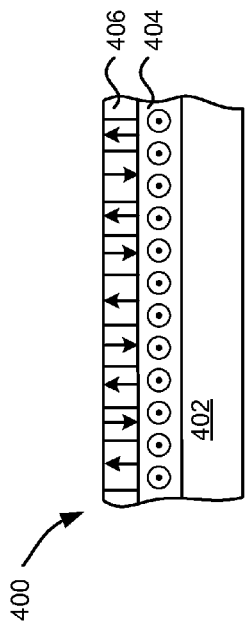

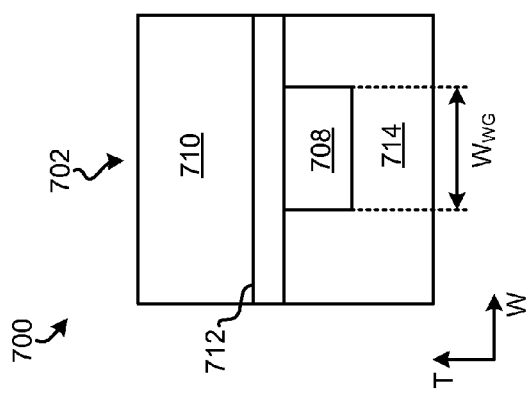
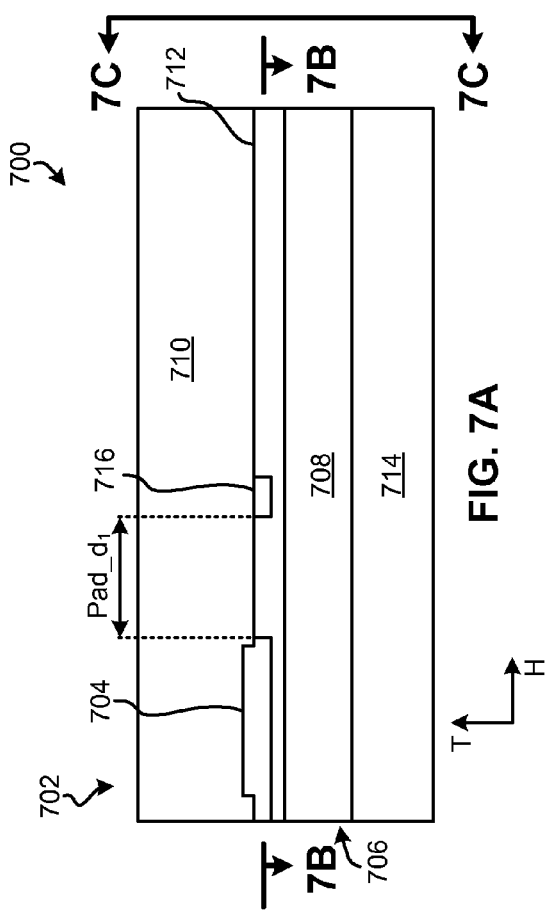
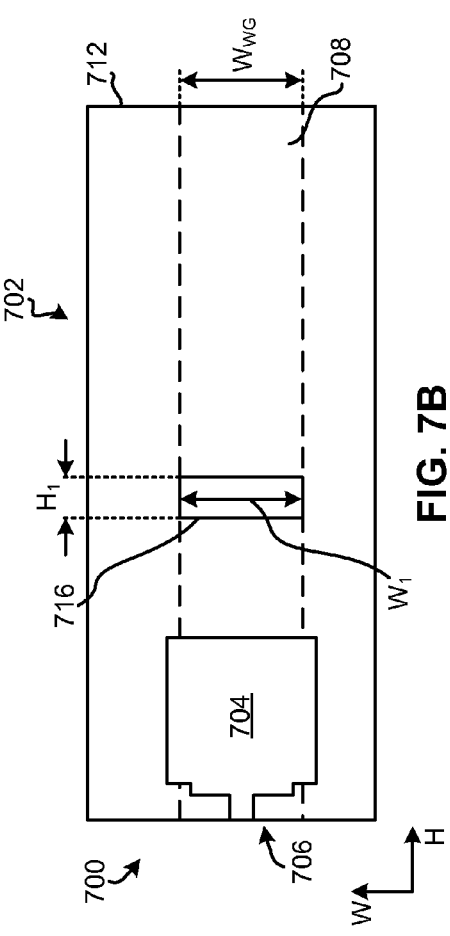
FIG. 7A
FIG. 7B
FIG. 7C

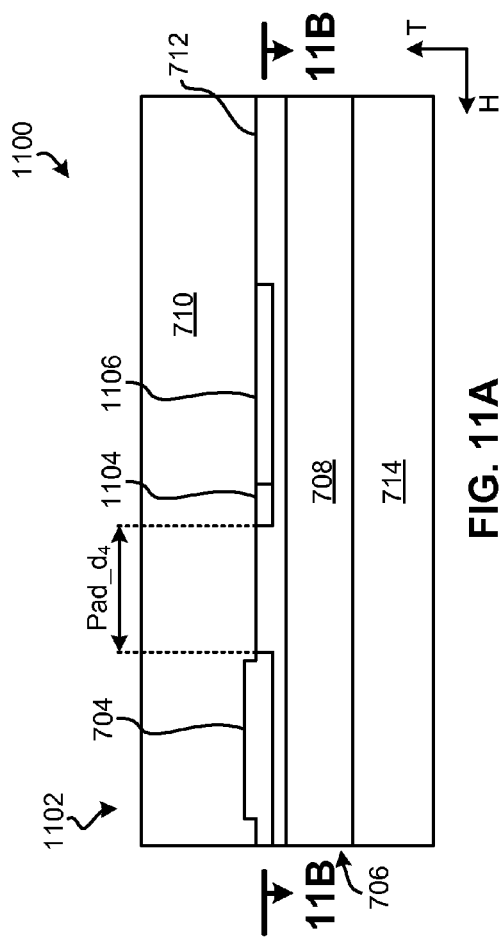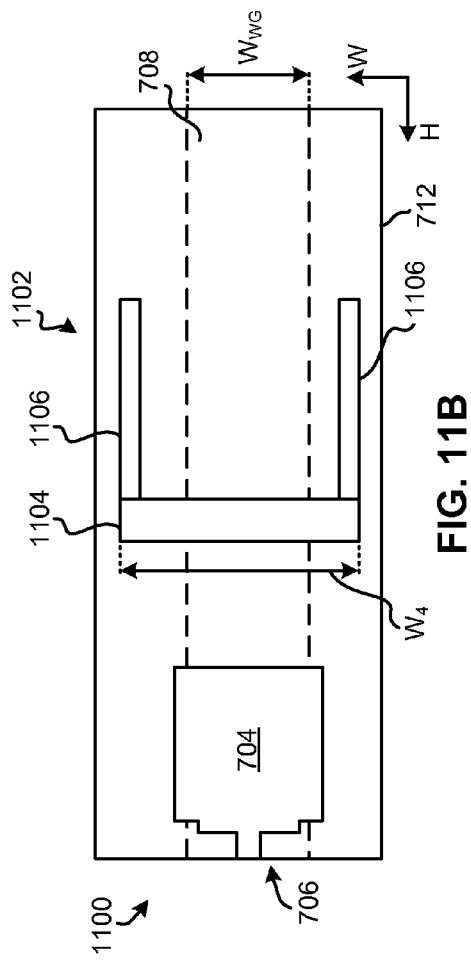
FIG. 11A
FIG. 11B

ANTI-REFLECTION WAVEGUIDE FOR HEAT-ASSISTED MAGNETIC RECORDING

FIELD OF THE INVENTION

The present invention relates to data storage systems, and more particularly, this invention relates to near field optical transducers having reduced reflection.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected data tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to meet this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. The ongoing quest for higher storage bit densities in magnetic media used in disk drives has reduced the size (volume) of data cells to the point where the cell dimensions are limited by the grain size of the magnetic material. Although grain size can be reduced further, there is concern that data stored within the cells is no longer thermally stable, as random thermal fluctuations at ambient temperatures are sufficient to erase data. This state is described as the superparamagnetic limit, which determines the maximum theoretical storage density for a given magnetic media. This limit may be raised by increasing the coercivity of the magnetic media or lowering the temperature. Lowering the temperature is not a practical option when designing hard disk drives for commercial and consumer use. Raising the coercivity is a practical solution, but requires write heads employing higher magnetic moment materials which will make data recording more challenging.

One additional solution has been proposed, which employs heat to lower the effective coercivity of a localized region on the magnetic media surface and writes data within this heated region. The data state becomes "fixed" upon cooling the media to ambient temperatures. This technique is broadly referred to interchangeably as "heat assisted magnetic recording" (HAMR) or "thermally assisted (magnetic) recording", TAR or TAMR. HAMR can be applied to both longitudinal and perpendicular recording systems, although the highest density state of the art storage systems are more likely to be perpendicular recording systems. Heating of the media surface has been accomplished by a number of techniques such as focused laser beams or near field optical sources.

Some implementations of HAMR employ a near field transducer (NFT) which is used to focus optical light from an optical light source down to a spot size on the order of tens of nanometers. An optical waveguide is used to channel the optical light from the optical light source to the NFT. The focused optical light is applied to magnetic media such that the spot size heats a localized region of the magnetic medium, thereby lowering the effective coercivity thereof. U.S. Pat. No. 6,999,384 to Stancil et al., which is herein incorporated by reference, discloses near field heating of a magnetic medium.

However, the optical light source receives optical feedback from the waveguide and NFT in the form of reflected optical light. It has been well established that output power of optical light sources will become unstable in the presence of even a small optical feedback. More specifically, stochastic mode hopping events in multimode laser diodes will result in random fluctuations in the output power. This is particularly undesirable, as maintaining a constant output power is important to create uniform bit sizes for the HAMR based magnetic recording.

Although reflection produced at the interface between the optical light source and the waveguide input has been suppressed by employing anti-reflection coating of dielectric layers, suppressing reflection arising from the NFT has not been achieved in previous attempts. Accordingly, a HAMR head having near zero reflection without relying on sophisticated structural optimization of the NFT and/or without compromising other performance characteristics is desired.

SUMMARY

A system, according to one embodiment, includes a magnetic head having: a near field transducer, an optical waveguide for illumination of the near field transducer, and an anti-reflection block positioned along the optical waveguide farther from a media facing side of the magnetic head than the near field transducer. The anti-reflection block is positioned a distance from the near field transducer to destructively interfere with light reflected away from the near field transducer.

A system, according to another embodiment, includes a magnetic head having: a near field transducer, an optical waveguide for illumination of the near field transducer, and an anti-reflection block positioned along the optical waveguide farther from a media facing side of the magnetic head than the near field transducer. The anti-reflection block is positioned a distance from the near field transducer to destructively interfere with light reflected away from the near field transducer. Moreover, the distance results in a near zero reflectance of light from the near field transducer in the waveguide of less than about 0.1% light reflectance. Furthermore, a height of the anti-reflection block in a height direction is less than about 200 nm.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 4 is a schematic representation of a perpendicular recording medium, according to one embodiment.

FIG. 5A is a schematic representation of a recording head and the perpendicular recording medium of FIG. 4, according to one embodiment.

FIG. 5B is a schematic representation of a recording apparatus configured to record separately on both sides of a perpendicular recording medium, according to one embodiment.

FIG. 7A is a partial cross-sectional view of a magnetic head, according to one embodiment.

FIG. 7B is a partial cross-sectional view of the magnetic head in FIG. 7A taken along line 7B-7B.

FIG. 7C is a partial side view of the magnetic head in FIG. 7A taken along line 7C-7C.

FIG. 11A is a partial cross-sectional view of a magnetic head, according to one embodiment.

FIG. 11B is a partial cross-sectional view of the magnetic head in FIG. 11A taken along line 11B-11B.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a system includes a magnetic head having: a near field transducer, an optical waveguide for illumination of the near field transducer, and an anti-reflection block positioned along the optical waveguide farther from a media facing side of the magnetic head than the near field transducer. The anti-reflection block is positioned a distance from the near field transducer to destructively interfere with light reflected away from the near field transducer.

In another general embodiment, a system includes a magnetic head having: a near field transducer, an optical waveguide for illumination of the near field transducer, and an anti-reflection block positioned along the optical waveguide farther from a media facing side of the magnetic head than the near field transducer. The anti-reflection block is positioned a distance from the near field transducer to destructively interfere with light reflected away from the near field transducer. Moreover, the distance results in a near zero reflectance of light from the near field transducer in the waveguide of less than about 0.1% light reflectance. Furthermore, a height of the anti-reflection block in a height direction is less than about 200 nm.

Figure 1:
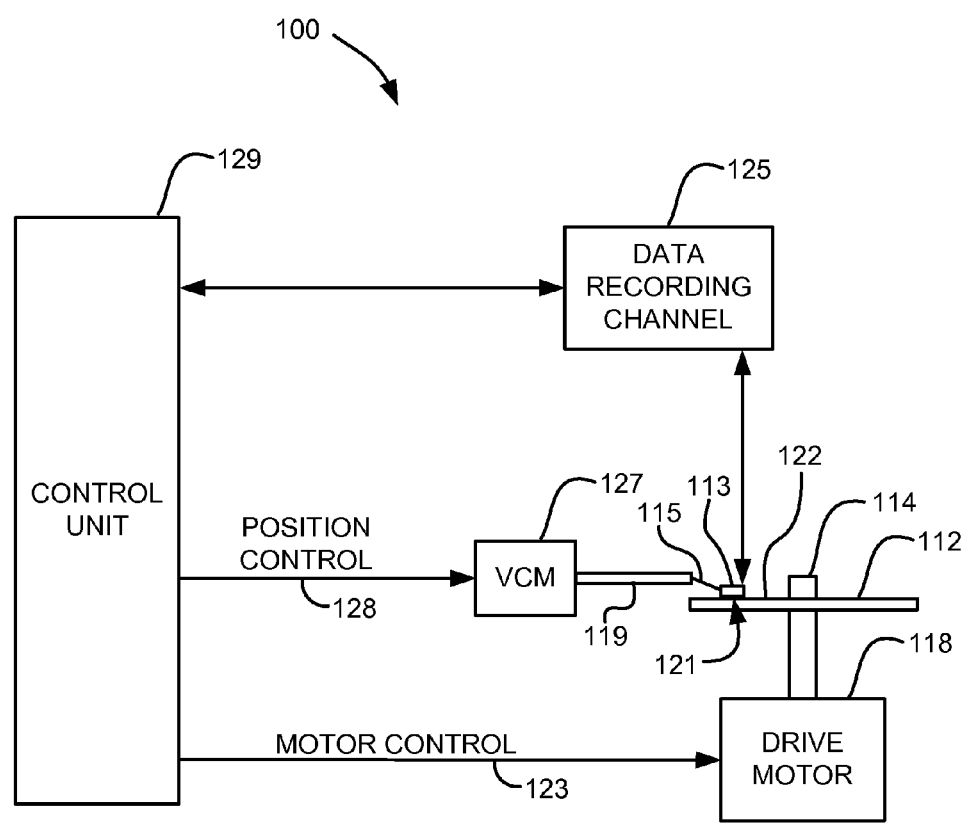
FIG. 1 is a simplified drawing of a magnetic recording disk drive system, according to one embodiment.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

Regarding a magnetic head, an inductive write portion therein includes a coil layer embedded in one or more insulation layers (insulation stack), the insulation stack being located between first and second pole piece layers. A gap may be formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
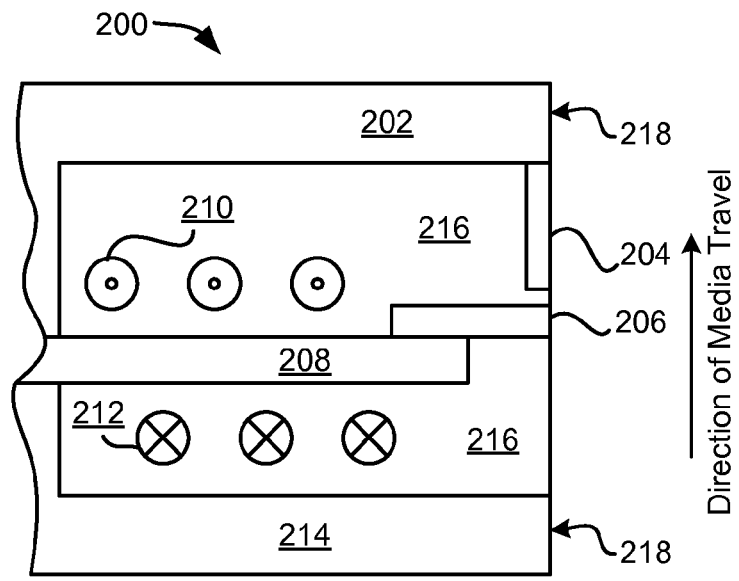
FIG. 2A is a cross-sectional view of a perpendicular magnetic head with helical coils, according to one embodiment.

FIG. 2A is a cross-sectional view of a perpendicular magnetic head 200, according to one embodiment. In FIG. 2A, helical coils 210 and 212 are used to create magnetic flux in the stitch pole 208, which then delivers that flux to the main pole 206. Coils 210 indicate coils extending out from the page, while coils 212 indicate coils extending into the page. Stitch pole 208 may be recessed from the ABS 218. Insulation 216 surrounds the coils and may provide support for some of the elements. The direction of the media travel, as indicated by the arrow to the right of the structure, moves the media past the lower return pole 214 first, then past the stitch pole 208, main pole 206, trailing shield 204 which may be connected to the wrap around shield (not shown), and finally past the upper return pole 202. Each of these components may have a portion in contact with the ABS 218. The ABS 218 is indicated across the right side of the structure.

Perpendicular writing is achieved by forcing flux through the stitch pole 208 into the main pole 206 and then to the surface of the disk positioned towards the ABS 218.

Figure 2B:
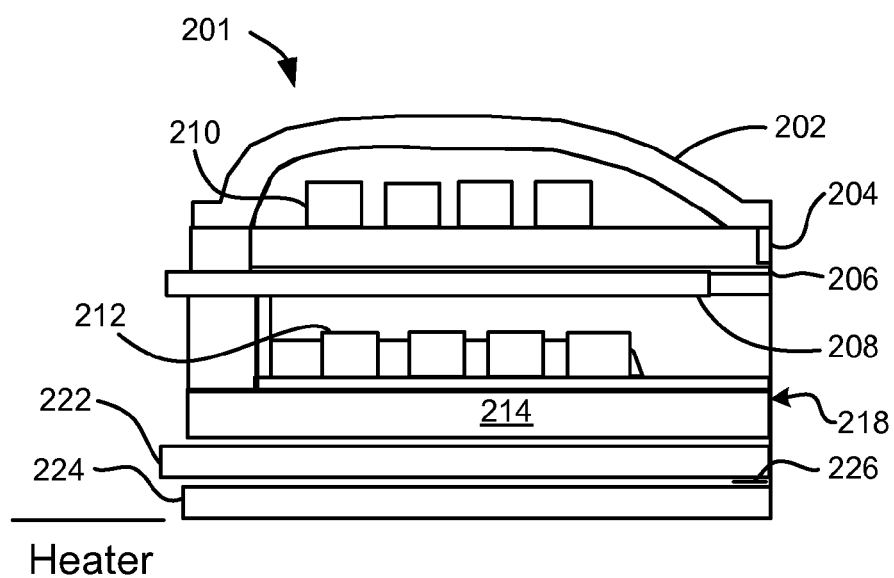
FIG. 2B is a cross-sectional view a piggyback magnetic head with helical coils, according to one embodiment.

FIG. 2B illustrates one embodiment of a piggyback magnetic head 201 having similar features to the head 200 of FIG. 2A. As shown in FIG. 2B, two shields 204, 214 flank the stitch pole 208 and main pole 206. Also sensor shields 222, 224 are shown. The sensor 226 is typically positioned between the sensor shields 222, 224.

Figure 3A:
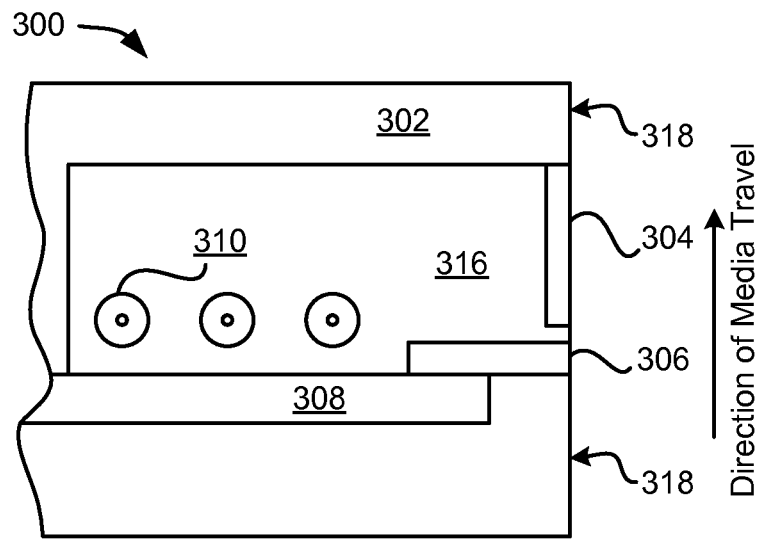
FIG. 3A is a cross-sectional view of a perpendicular magnetic head with looped coils, according to one embodiment.

FIG. 3A is a schematic diagram of another embodiment of a perpendicular magnetic head 300, which uses looped coils 310 to provide flux to the stitch pole 308, a configuration that is sometimes referred to as a pancake configuration. The stitch pole 308 provides the flux to the main pole 306. With this arrangement, the lower return pole may be optional. Insulation 316 surrounds the coils 310, and may provide support for the stitch pole 308 and main pole 306. The stitch pole may be recessed from the ABS 318. The direction of the media travel, as indicated by the arrow to the right of the structure, moves the media past the stitch pole 308, main pole 306, trailing shield 304 which may be connected to the wrap around shield (not shown), and finally past the upper return pole 302 (all of which may or may not have a portion in contact with the ABS 318). The ABS 318 is indicated across the right side of the structure. The trailing shield 304 may be in contact with the main pole 306 in some embodiments.

Figure 3B:
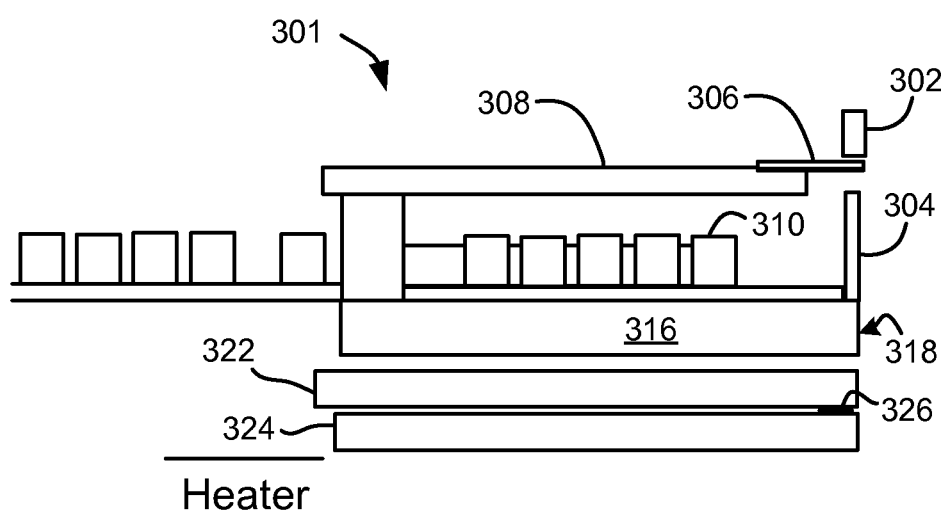
FIG. 3B is a cross-sectional view of a piggyback magnetic head with looped coils, according to one embodiment.

FIG. 3B illustrates another embodiment of a piggyback magnetic head 301 having similar features to the head 300 of FIG. 3A. As shown in FIG. 3B, the piggyback magnetic head 301 also includes a looped coil 310, which wraps around to form a pancake coil. Sensor shields 322, 324 are additionally shown. The sensor 326 is typically positioned between the sensor shields 322, 324.

In FIGS. 2B and 3B, an optional heater is shown near the non-ABS side of the magnetic head. A heater (Heater) may also be included in the magnetic heads shown in FIGS. 2A and 3A. The position of this heater may vary based on design parameters such as where the protrusion is desired, coefficients of thermal expansion of the surrounding layers, etc.

FIG. 4 provides a schematic diagram of a simplified perpendicular recording medium 400, which may also be used with magnetic disk recording systems, such as that shown in FIG. 1. As shown in FIG. 4, the perpendicular recording medium 400, which may be a recording disk in various approaches, comprises at least a supporting substrate 402 of a suitable non-magnetic material (e.g., glass, aluminum, etc.), and a soft magnetic underlayer 404 of a material having a high magnetic permeability positioned above the substrate 402. The perpendicular recording medium 400 also includes a magnetic recording layer 406 positioned above the soft magnetic underlayer 404, where the magnetic recording layer 406 preferably has a high coercivity relative to the soft magnetic underlayer 404. There may one or more additional layers (not shown), such as an "exchange-break" layer or "interlayer", between the soft magnetic underlayer 404 and the magnetic recording layer 406.

The orientation of magnetic impulses in the magnetic recording layer 406 is substantially perpendicular to the surface of the recording layer. The magnetization of the soft magnetic underlayer 404 is oriented in (or parallel to) the plane of the soft underlayer 404. As particularly shown in FIG. 4, the in-plane magnetization of the soft magnetic underlayer 404 may be represented by an arrow extending into the paper.

FIG. 5A illustrates the operative relationship between a perpendicular head 508 and the perpendicular recording medium 400 of FIG. 4. As shown in FIG. 5A, the magnetic flux 510, which extends between the main pole 512 and return pole 514 of the perpendicular head 508, loops into and out of the magnetic recording layer 406 and soft magnetic underlayer 404. The soft magnetic underlayer 404 helps focus the magnetic flux 510 from the perpendicular head 508 into the magnetic recording layer 406 in a direction generally perpendicular to the surface of the magnetic medium. Accordingly, the intense magnetic field generated between the perpendicular head 508 and the soft magnetic underlayer 404, enables information to be recorded in the magnetic recording layer 406. The magnetic flux is further channeled by the soft magnetic underlayer 404 back to the return pole 514 of the head 508.

As noted above, the magnetization of the soft magnetic underlayer 404 is oriented in (parallel to) the plane of the soft magnetic underlayer 404, and may represented by an arrow extending into the paper. However, as shown in FIG. 5A, this in plane magnetization of the soft magnetic underlayer 404 may rotate in regions that are exposed to the magnetic flux 510.

FIG. 5B illustrates one embodiment of the structure shown in FIG. 5A, where soft magnetic underlayers 404 and magnetic recording layers 406 are positioned on opposite sides of the substrate 402, along with suitable recording heads 508 positioned adjacent the outer surface of the magnetic recording layers 406, thereby allowing recording on each side of the medium.

Except as otherwise described herein with reference to the various inventive embodiments, the various components of the structures of FIGS. 1-5B, and of other embodiments disclosed herein, may be of conventional material(s), design, and/or fabricated using conventional techniques, as would become apparent to one skilled in the art upon reading the present disclosure.

As mentioned above, some implementations of HAMR employ a NFT to transduce optical light from an optical light source to an optical near field spot having a size, e.g., on the order of tens of nanometers, which is generated in the space between the NFT and magnetic media, thereby increasing the temperature of the media at the optical spot. A write pole tip applies a magnetic field to the media at the optical spot.

However, conventional HAMR heads are plagued by poor performance resulting from optical light reflected back towards the optical light source by the waveguide and the NFT. It has been well established that output power of optical light sources becomes unstable in the presence of even a small optical feedback. More specifically, stochastic mode hopping events in multimode laser diodes result in random fluctuations in the output power. This is particularly undesirable, as maintaining a constant output power is important to create uniform bit sizes for the HAMR based magnetic recording.

In sharp contrast to the aforementioned issues, various embodiments described and/or suggested herein experience reduced optical light reflection back to the optical light source, thereby improving write performance as will be described in further detail below.

Figure 6:
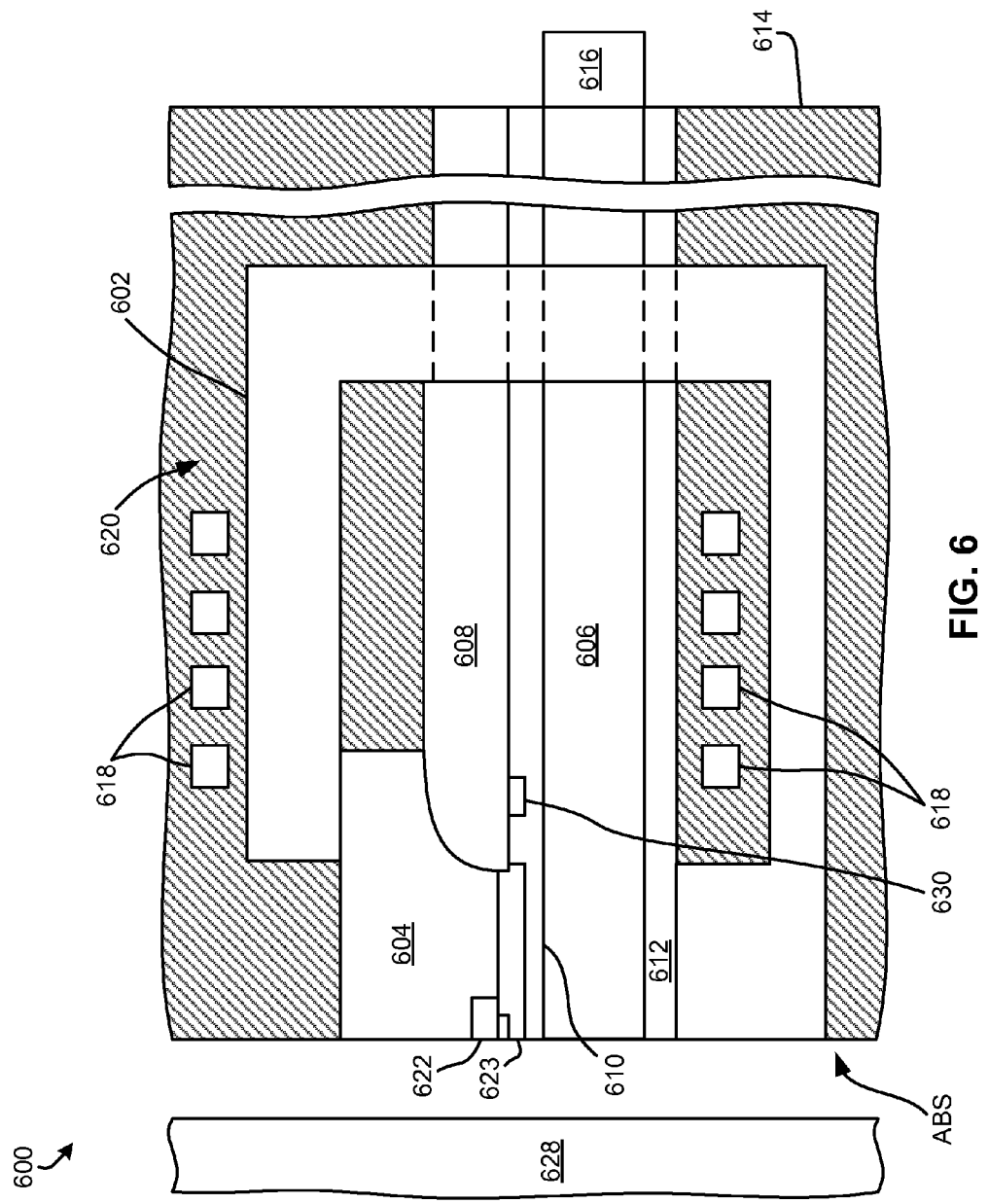
FIG. 6 is a partial cross-sectional view of a thin film perpendicular write head, according to one embodiment.

FIG. 6 depicts a partial cross-sectional view of a magnetic HAMR head 600, in accordance with one embodiment. As an option, the present head 600 may be implemented in conjunction with features from any other embodiment listed herein, such as those described with reference to the other FIGS. Of course, however, such head 600 and others presented herein may be used in various applications and/or in permutations which may or may not be specifically described in the illustrative embodiments listed herein. Further, the head 600 presented herein may be used in any desired environment.

It should be noted that the dimensions of some components illustrated in FIG. 6 may be exaggerated (e.g., larger and/or smaller than would typically be observed) relative to other components, which are in no way intended to limit the invention. Moreover, to simplify and clarify the structures presented, and spacing layers, insulating layers may be omitted from the subsequent figures and/or descriptions. Thus, although FIG. 6 illustrates an illustrative cross-sectional view of a magnetic HAMR head 600, additional and/or alternative layers and combinations of layers may be used in the structure as would be appreciated by one of ordinary skill in the relevant art upon reading the present disclosure, including insulating layers, adhesion layers, etc. In addition, any of the layers described in relation to head 600 may be comprised of multiple layers, which may or may not be of the same material.

Referring now to FIG. 6, the head 600 includes a return pole 602 which is coupled to the main pole 604, a portion of the main pole 604 being positioned at the media facing side. The return pole 602 may include a conventional magnetic alloy or material. Exemplary materials for the return pole 602 include Co, Ni, Fe, Cr etc. and/or combinations thereof. Moreover, the main pole 604 may include any known suitable material, such as NiFe, CoFe, CoNiFe, CoFeCr etc.

The head 600 also includes an optical waveguide 606, surrounded by cladding layers 608, 610, 612. According to the present embodiment, the cladding layers 608, 610, 612 are illustrated as extending to at least the flex side 614; although in other embodiments, some or all of the cladding layers may not extend to the flex side 614.

Optical waveguide 606 is illustrated in the present embodiment, as being separated from the NFT 623 by one of the cladding layers 610 which forms a type of recess between the optical waveguide 606 and the NFT 623. However, in other embodiments, the optical waveguide 606 may be in direct contact with the NFT 623, e.g., as desired. Further, cladding layer 610 is also directly adjacent a side of the optical waveguide 606, e.g., extending parallel to a longitudinal axis of the optical waveguide 606 along its stripe height. Additionally, another one of the cladding layers 612 extends below the NFT 623, thereby forming a portion of the media facing side. In some embodiments, the optical waveguide 606 may be positioned above two cladding layers.

In various embodiments, the cladding layers 608, 610, 612 may include any material as would be known to one of ordinary skill in the relevant art, such as $Al_2O_3$, $SiO_2$, etc. Moreover, the cladding layers 608, 610, 612 may include same, similar or different materials, depending on the desired embodiment.

The optical waveguide 606 extends to the flex side 614 having a near field optical light source 616, e.g., a laser. However, in other approaches, the optical waveguide 606 may be spaced from the optical light source 616 depending on the desired embodiment.

The optical light source 616 emits an optical signal, e.g., light, that is desirably directed along the optical waveguide 606, towards the NFT. Thus the optical waveguide 606 is generally used to deliver light energy to the NFT which creates a small hot-spot on the surface of the magnetic medium 628, thereby inducing isolated heating of the magnetic medium 628 (e.g., disk) surface. The optical waveguide 606 preferably includes a material having a high refractive index (e.g., at least higher than the cladding layers 608, 610, 612), thereby assisting in keeping the optical signal, emitted from the optical light source 616, within the optical waveguide 606. Illustrative materials for the optical waveguide 606 include, but are not limited to, $TaO_x$, $TiO_x$, $NbO_x$, $ZrO_x$, HfOx etc. Other exemplary materials for the optical waveguide 606 may include $Ta_2O_5$, and/or $TiO_2$.

The cladding layers 608, 610, 612 preferably include a material having a low refractive index, e.g., so as to keep the optical signal confined within the sidewalls of the optical waveguide. In general, a low refractive index material may include any material having refractive index below about 1.75, but could be higher or lower depending on the desired embodiment. In other approaches, the low refractive index may be lower than the refractive index of the optical waveguide 606. Illustrative materials for the cladding layers 608, 610, 612 include refractive oxides such as $AlO_x$, $SiO_x$, etc. or other conventional materials having a desirably low refractive index.

As shown, the optical waveguide 606 may have an approximately uniform cross-section along its length. However, as well known in the art, the optical waveguide 606 may have a number of other possible designs including a planar solid immersion mirror or planar solid immersion lens which have a non-uniform core cross-section along the waveguide's length. Thus, according to various approaches, the optical waveguide 606 may have any other cross-sectional profile as selected by one of ordinary skill in the relevant art, such as a rectangular, square, triangular, circular, etc., cross-section.

With continued reference to FIG. 6, the head 600 also includes write coils 618 positioned in a conventional insulation layer 620, e.g., alumina. As would be appreciated by one skilled in the art, the write coils may assist the head 600 perform write operations by inducing a magnetic field in the return pole 602 which is transferred to the main pole 604 and concentrated in a magnetic lip 622 which is used to write to a magnetic medium 628 (e.g., a magnetic disk) spaced therefrom. In other words, the magnetic lip 622 may serve as a write pole. Thus, the magnetic lip 622 is preferably magnetically coupled to the main pole 604, and the return pole 602. In other embodiments, the main pole 604 may have a step formed near the lower portion of the main pole 604.

As illustrated, a preferred configuration of the NFT 623 includes a nanobeak design as described in detail in U.S. Pat. No. 8,619,516 which is herein incorporated by reference. However, the partial cross-sectional view of the head 600 in FIG. 6 is not meant to limit the structure of the NFT 623 as described herein. Depending on the approach, the NFT 623 may embody an E-antenna, have a triangular shape, be a lollipop NFT, etc., as desired.

The NFT 623 is used to assist in performing write operations. As described above, an NFT may be used to heat the magnetic medium, thereby weakening the magnetic stability of the magnetic grains thereof to allow writing thereto. The energy to heat the magnetic medium may be supplied to the NFT 623 from the optical light source 616 via the optical waveguide 606. In preferred embodiments, this allows for the magnetic field concentrated at the magnetic lip 622 to influence the magnetic orientation of the magnetic grains on the medium 628, e.g., to perform a write operation. Therefore, it is desirable that the NFT is located adjacent the magnetic lip 622, e.g., as illustrated in FIG. 6.

As previously mentioned, not all of the power from the optical light source is delivered to the tip of an NFT. For example, some of the power is lost at the interface between the optical light source and the optical waveguide input.

While overall transmission in the optical waveguide may be relatively high, additional coupling losses may be experienced when the optical mode carried in the optical waveguide is converted into the surface plasmon mode in the NFT. Wherever non-ideal coupling arises from the interface between two seemingly different optical elements, some of uncoupled light can be reflected back, eventually returning back to the optical light source.

It has been well established that output power of optical light sources becomes unstable in the presence of even a small optical feedback. More specifically, stochastic mode hopping events in multimode laser diodes results in random fluctuations in the output power. This is particularly undesirable, as maintaining a constant output power is important to create uniform bit sizes for the HAMR based magnetic recording.

Although reflection produced at the interface between the optical light source and the waveguide input has been suppressed by employing anti-reflection coating of dielectric layers, suppressing reflection arising from the NFT has not been achieved in previous attempts. This is particularly apparent in view of the strong interconnected relationship between the various characteristics of HAMR heads, e.g., such as operating temperatures of the NFT, hot spot size on the media, the thermal gradient of the hot spot, etc.

In order to overcome the poor performance resulting from optical light reflected back towards the optical light source by the waveguide and/or NFT experienced in conventional HAMR heads, embodiments described herein may implement anti-reflection blocks. One or more anti-reflection blocks 630 may be positioned along the optical waveguide 606, e.g., farther from a media facing side ABS of the magnetic head than the NFT 623. The dimensions, material compositions, placement, etc. of such anti-reflection blocks may be adjusted to desirably reduce the amount of optical light reflected back towards the optical light source, as will soon become apparent.

FIGS. 7A-7C illustrate different detailed views of a portion of a magnetic head 702 in system 700, in accordance with one embodiment. As an option, the present system 700 may be implemented in conjunction with features from any other embodiment listed herein, such as those described with reference to the other FIGS., e.g., such as FIG. 6. Of course, however, such system 700 and others presented herein may be used in various applications and/or in permutations which may or may not be specifically described in the illustrative embodiments listed herein. Further, the system 700 presented herein may be used in any desired environment.

It should be noted that the dimensions of the components illustrated in FIGS. 7A-7C may be exaggerated (e.g., larger than would typically be observed) relative to other components, which are in no way intended to limit the invention. Moreover, to simplify and clarify the structures presented, and spacing layers, insulating layers may be omitted from the subsequent figures and/or descriptions. Thus, although FIGS. 7A-7C illustrate illustrative views of a magnetic head 702 in system 700, additional and/or alternative layers and combinations of layers may be used in the structure as would be appreciated by one of ordinary skill in the relevant art upon reading the present disclosure, including insulating layers, adhesion layers, etc. In addition, any of the layers described in relation to system 700 may be comprised of multiple layers, which may or may not be of the same material.

Referring now to the partial cross-sectional views of system 700 in FIG. 7A-7B, the magnetic HAMR head 702 includes a NFT 704 positioned towards a media facing side 706 thereof. As described above, the construction and/or design of NFT 704 may vary depending on the desired embodiment. However, in preferred embodiments, NFT 704 may be a nanobeak NFT having a triangular output tip as described in detail in U.S. Pat. No. 8,619,516 which is herein incorporated by reference.

Head 702 also has an optical waveguide 708 and cladding layers 710, 712, 714 extending away from the media facing side 706 in a height direction H, as shown in the view of the magnetic head in FIG. 7A. As previously mentioned, the optical waveguide 708 preferably directs an optical signal from an optical light source (not shown) to the NFT 704 while cladding layers 710, 712, 714 encourage the optical signal confined within the sidewalls of the optical waveguide. Thus the optical waveguide 708 may be used to illuminate (e.g., deliver light energy to) the NFT 704 which creates a small hot-spot on the surface of the magnetic media, thereby inducing isolated heating of the surface of the magnetic media. According to an exemplary approach, which is in no way intended to limit the invention, cladding layer 712 may include SiO, e.g., to improve the coupling efficiency between the optical waveguide 708 and the NFT 704, while cladding layers 710, 714 may include AlO. However, depending on the desired embodiment, optical waveguide 708 and/or any of the cladding layers 710, 712, 714 may include any of the approaches described above, e.g., with reference to optical waveguide 606 of FIG. 6.

Referring still to FIG. 7A, magnetic head 702 further includes an anti-reflection block 716 positioned along the optical waveguide 708 farther from a media facing side 706 of the magnetic head 702 than the NFT 704. The anti-reflection block 716 is configured and positioned to destructively interfere with light reflected away from the NFT 704 and back into the optical waveguide 708 in a direction towards the optical light source. It should be noted that although anti-reflection block 716 is depicted in the present embodiment as being positioned in cladding layer 712, anti-reflection block 716 may be positioned wholly, or partially, in waveguide 708 in other embodiments.

As previously described, the optical light which is actually reflected from the NFT 704 and back towards the optical light source through the optical waveguide 708 can have a negative effect on the overall system. In conventional HAMR heads, this reflection of optical light back towards the optical light source is not compensated for, thereby resulting in degraded system performance.

In sharp contrast to these conventional shortcomings, various embodiments disclosed herein may be able to achieve reduced optical light reflection by implementing one or more anti-reflection blocks, thereby improving write performance, as will soon become apparent.

Looking specifically to FIGS. 7A-7B, the characteristics, e.g., dimensions in the thickness direction T, height direction H, width direction W; material composition; placement; etc.; of anti-reflection block 716 may be chosen such that anti-reflection block 716 has a desired effect on the system 700. The characteristics are preferably chosen such that a near zero reflectance of light from the NFT 704 back into the optical waveguide 708 is achieved. Referring to the present description, "near zero" reflectance of light may refer to a reflectance of light from the NFT 704 back into the optical waveguide 708 of less than about 0.1% light reflectance, more preferably less than about 0.01% light reflectance, but could be higher or lower depending on the desired embodiment.

Each characteristic of anti-reflection block 716 may be interrelated. In other words, changing one or more of the characteristic of anti-reflection block 716 may have a corresponding effect on the other characteristics thereof. According to an example, two anti-reflection blocks having the same dimensions and placement with respect to the NFT 704, but different material compositions may affect light reflected from the NFT 704 back into the optical waveguide 708 differently. Moreover, different system parameters may have different effects on the performance of an anti-reflection block 716. For example, the same anti-reflection block 716 may have a different effect on the amount of optical light reflected from the NFT 704 back into the optical waveguide 708 depending on the wavelength of the optical light being used.

It follows that characteristics of anti-reflection blocks and/or system parameters may be selected during design, manufacture, etc. depending on the desired embodiment, e.g., to achieve an improved overall system performance. System parameters which have an effect on the effectiveness of anti-reflection blocks on the overall performance of the given embodiment may include reflectivity of the NFT, type of NFT, wavelength of optical light being supplied to the NFT, etc. However, characteristics of anti-reflection blocks and/or system parameters may be fixed after a point of manufacture. Accordingly, it is preferred that the characteristics of an anti-reflection block 716 and/or the parameters of a system 700 are determined and tuned prior to being manufactured, e.g., reduced to a physical embodiment. Characteristics of anti-reflection blocks and/or system parameters may vary according to any of the following implementations.

According to some embodiments, the distance $Pad\_d_1$ which separates anti-reflection block 716 from the NFT 704 is preferably chosen such that anti-reflection block 716 is able to destructively interfere with light reflected away from NFT 704 back into the optical waveguide 708. In other embodiments, the height $H_1$ of the anti-reflection block 716 in a height direction H is preferably chosen such that anti-reflection block 716 is able to destructively interfere with light reflected away from NFT 704 back into the optical waveguide 708, thereby minimizing the amount of light reflected back towards the optical light source. However, as mentioned above, the effect caused by a particular distance $Pad\_d_1$ and/or height $H_1$ may vary depending on other characteristics and/or system parameters. In one example, the distance $Pad\_d_1$ may be adjusted to a value which results in a near zero reflectance of light from the near field transducer in the waveguide of less than about 0.1%, more preferably less than about 0.01% light reflectance.

Figure 8A:
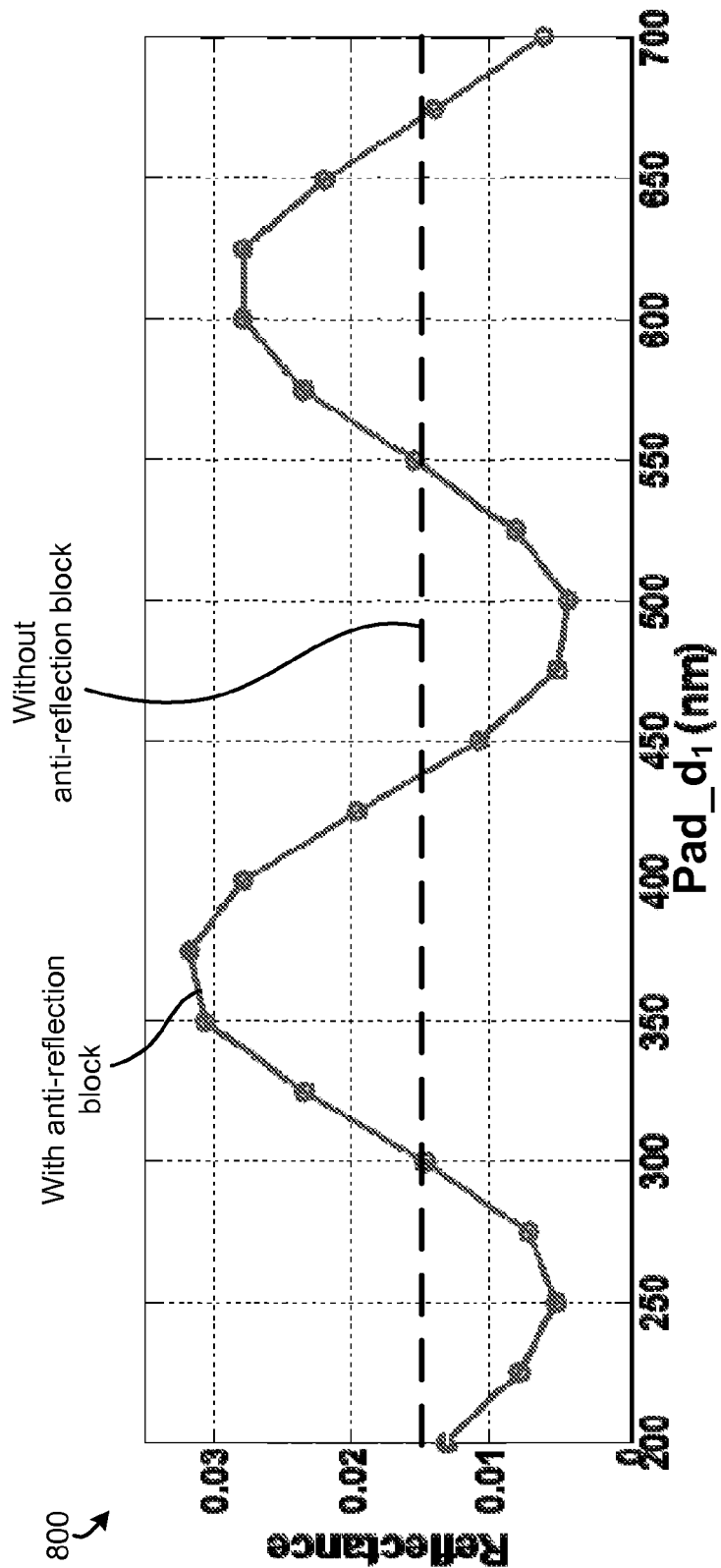
FIG. 8A is a graph illustrating reflectance vs. the distance separating an NFT from an anti-reflection block, according to one embodiment.

Referring momentarily to the embodiment of FIG. 8A, graph 800 illustrates the oscillating amount of optical light reflected back towards the optical light source resulting from modeling a particular anti-reflection block at different distances $Pad\_d_1$ from an NFT. The improvements achieved by modeling the implementation of the anti-reflection block are particularly apparent when compared to the performance of the same system absent the anti-reflection block as labeled by the dashed line fixed at a reflectance of 1.43%.

Accordingly, graph 800 shows how the NFT reflectance will change as a function of $Pad\_d_1$ for a fixed height $H_1$ of the anti-reflection block. In the present implementation, the anti-reflection block was modeled to have a height of 100 nm, and consist of gold. Looking to FIG. 8A, the oscillatory feature with distance $Pad\_d_1$ may imply that optical interference plays an important role in achieving the lower reflectance of 0.53% and 0.44% corresponding to $Pad\_d_1$ values of 250 nm and 500 nm, respectively. Actually, the physical separation of 250 nm corresponds to half-wavelength ($\lambda/2$) inside the optical waveguide in consideration of the phase refractive index of the fundamental guided mode at an assumed wavelength of 830 nm for the optical light source according to the present modeling.

Figure 8B:
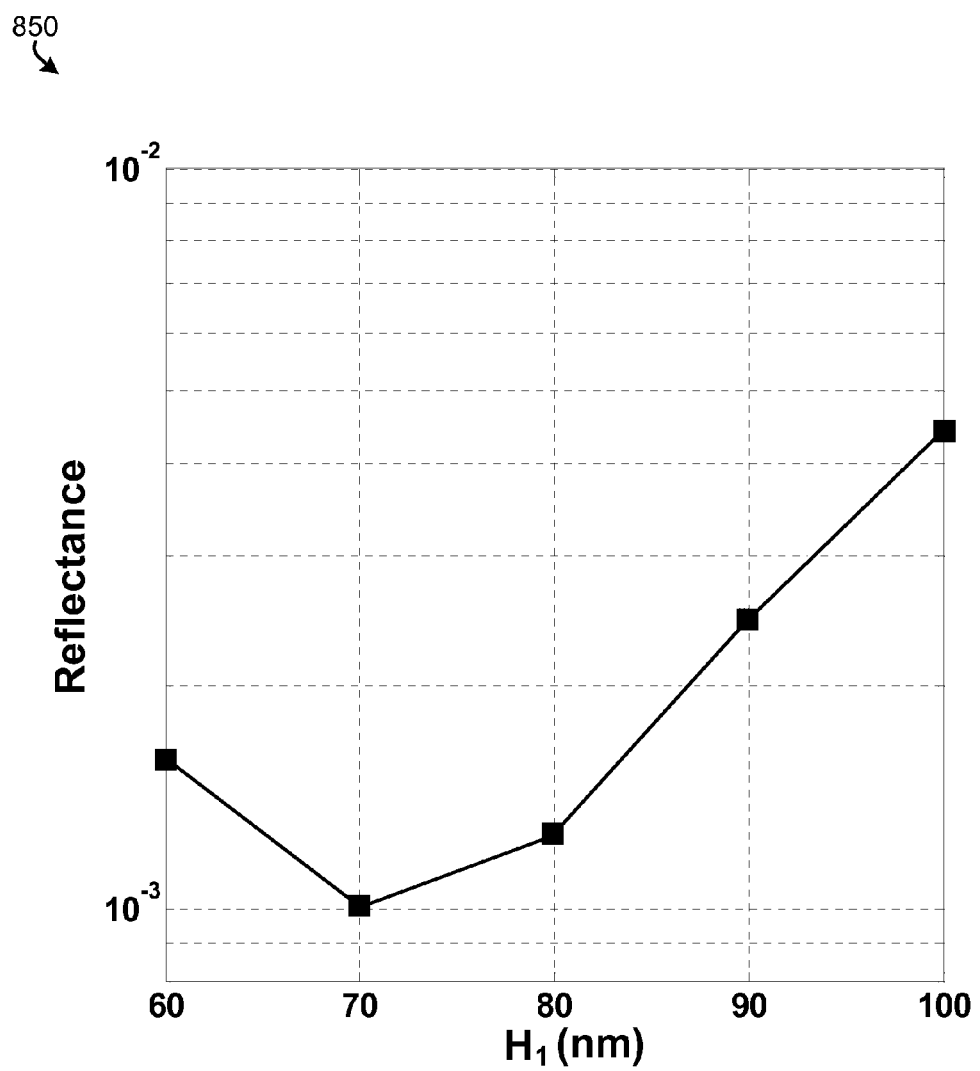
FIG. 8B is a graph illustrating reflectance vs. the height of an anti-reflection block, according to one embodiment.

Moreover, as mentioned above, further reductions may be made to the amount of optical light reflected back towards the optical light source by controlling the height $H_1$ of the anti-reflection block. In FIG. 8B, graph 850 presents how further fine tuning of system performance may be performed. As a value of Pad_$d_1$=500 nm is shown as producing the minimum reflectance for the particular embodiment modeled in FIG. 8A, the modeling illustrated in FIG. 8B has fixed distance Pad_$d_1$ at 500 nm while the height $H_1$ of the anti-reflection block is varied in the range of 60 nm to 100 nm. Looking to graph 850, the optimum height $H_1$ of the anti-reflection block is found to be at about 70 nm, resulting in a reflectance of about 0.1%.

By sweeping the height $H_1$ of the anti-reflection block, the modeling shown in FIG. 8B has effectively tuned the reflectance from the anti-reflection block. Moreover, by controlling distance Pad_$d_1$, a desired optical thickness effected by the position of the anti-reflection block and the NFT has been determined, e.g., though defining the precise location of the NFT is difficult in view of the about 1 μm height of the NFT. Here, controlling the height $H_1$ has produced a desirable optical reflectivity that achieves an improved anti-reflection condition.

Accordingly, referring again to FIG. 7A, the distance Pad_$d_1$ which separates anti-reflection block 716 from the NFT 704 and/or height $H_1$ may be selected in consideration of other characteristics of the anti-reflection block and/or system parameters to achieve a desired amount of reflectance. As mentioned above, the effect caused by a particular dimension may vary depending on other characteristics and/or system parameters. Accordingly, the height $H_1$ of the anti-reflection block 716 may be less than about 200 nm, but could be higher or lower depending on the desired embodiment. According to an exemplary embodiment, which is in no way intended to limit the invention, an implementation of a gold anti-reflection block 716 may have a height $H_1$ of about 100 nm, but could be higher or lower as desired.

According to other embodiments, the width $W_1$ of the anti-reflection block 716 in a width direction W is preferably chosen such that anti-reflection block 716 is able to destructively interfere with light reflected away from NFT 704 back into the optical waveguide 708, thereby minimizing the amount of light reflected back towards the optical light source. The width $W_1$ of the anti-reflection block 716 is preferably at least as wide as the width $W_{WG}$ of the optical waveguide 708 in the width direction W (the crosstrack direction). Accordingly, the width $W_1$ of the anti-reflection block 716 may be greater than the width $W_{WG}$ of the optical waveguide according to some embodiments (e.g., see FIGS. 11A-11B below).

Referring still to FIG. 7A, the material composition of anti-reflection block 716 may be constructed of a material that destructively interferes with optical light reflected back from the NFT, e.g., is reflective enough to provide the desired optical interference effect. According to various approaches, anti-reflection block 716 may include one or more metallic materials (e.g., gold), dielectrics preferably having a relatively high index of refraction (e.g., silicon), etc., and/or combinations thereof. Other materials may also be used, as would be appreciated by one skilled in the art upon reading the present description.

In some approaches, the anti-reflection block 716 may be constructed of a same material as the NFT 704, and may preferably have the identical composition. Accordingly, in some approaches the anti-reflection block 716 and the NFT 704 may have physical characteristics of being formed in a same deposition process, e.g., such as one or more of identical composition, formation along the same plane, formation on a same layer in the thin film structure, etc.

It should also be noted that primarily light which is reflected into the optical waveguide 708 and back towards the optical light source is being proactively addressed in the present embodiments. Accordingly, the amount of light which is scattered away by the anti-reflection block 716 from the optical waveguide 708, e.g., in a direction other than back towards the optical light source, may not be affected by some of the embodiments disclosed herein. However, some of the embodiments described herein may have a tangential effect on the amount of light which is reflected away from the optical waveguide 708 as well as the amount of optical light which is reflected into the optical waveguide 708 and back towards the optical light source.

Figure 9C:
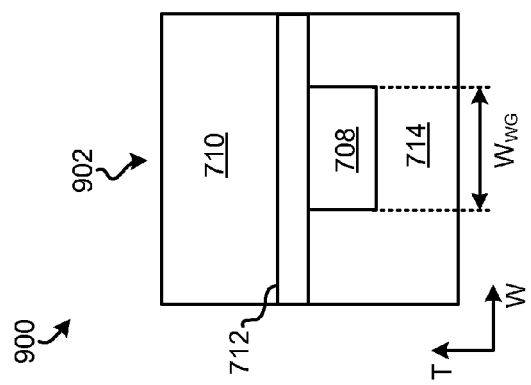
FIG. 9C is a partial side view of the magnetic head in FIG. 9A taken along line 9C-9C.
Figure 9A:
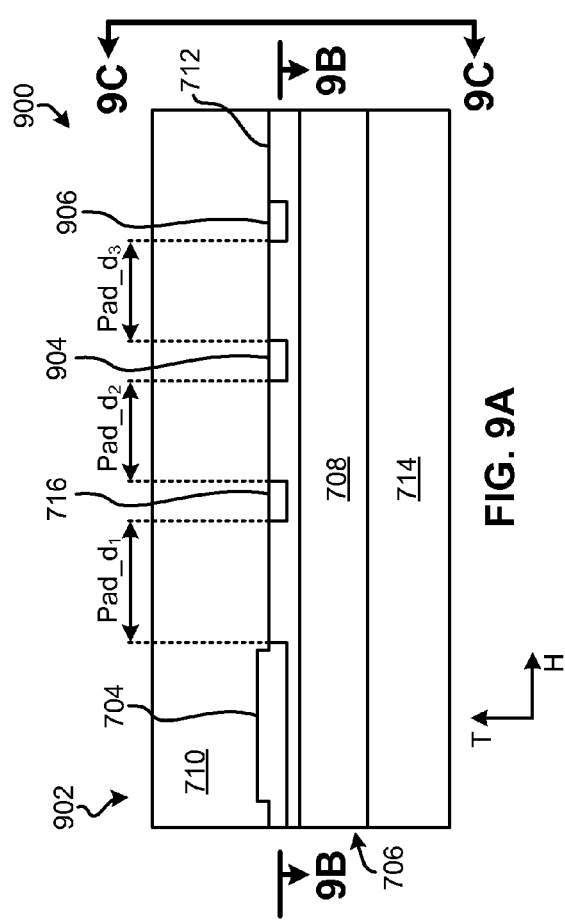
FIG. 9A is a partial cross-sectional view of a magnetic head, according to one embodiment.
Figure 9B:
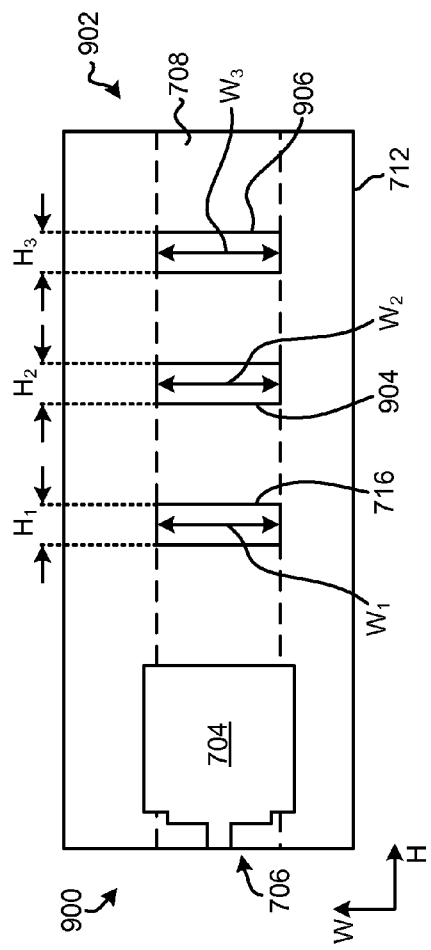
FIG. 9B is a partial cross-sectional view of the magnetic head in FIG. 9A taken along line 9B-9B.

Although system 700 of FIGS. 7A-7C illustrate an embodiment having a single anti-reflection block 716, other embodiments may implement more anti-reflection blocks. According to some approaches, which are in no way intended to limit the invention, the percentage of reflected optical light which affects the optical light source via the optical waveguide may be further reduced by implementing additional anti-reflection blocks (e.g., more than one, at least two, at least three, multiple, an array, etc.). Specifically, FIGS. 9A-9C illustrate detailed views of a media facing side of a magnetic head 902 in system 900, in accordance with one embodiment. As an option, the present system 900 may be implemented in conjunction with features from any other embodiment listed herein, such as those described with reference to the other FIGS., e.g., such as FIGS. 6-7C. Specifically, FIGS. 9A-9C illustrate variations of the embodiment of FIGS. 7A-7C depicting another exemplary configuration within the magnetic head 902. Accordingly, various components of FIGS. 9A-9C have common numbering with those of FIGS. 7A-7C.

Of course, however, such system 900 and others presented herein may be used in various applications and/or in permutations which may or may not be specifically described in the illustrative embodiments listed herein. Further, the system 900 presented herein may be used in any desired environment.

It should be noted that the dimensions of the components illustrated in FIGS. 9A-9C may be exaggerated (e.g., larger than would typically be observed) relative to other components, which are in no way intended to limit the invention. Moreover, to simplify and clarify the structures presented, and spacing layers, insulating layers may be omitted from the subsequent figures and/or descriptions. Thus, although FIGS. 9A-9C illustrate illustrative views of a magnetic head 902 in system 900, additional and/or alternative layers and combinations of layers may be used in the structure as would be appreciated by one of ordinary skill in the relevant art upon reading the present disclosure, including insulating layers, adhesion layers, etc. In addition, any of the layers described in relation to system 900 may be comprised of multiple layers, which may or may not be of the same material.

The magnetic head 902 illustrated in FIG. 9A-9C has an optical waveguide 708 and cladding layers 710, 712, 714 extending away from the media facing side 706. Moreover, looking to the partial cross-sectional view of system 900 in FIGS. 9A-9B, in addition to anti-reflection block 716, magnetic head 902 includes second anti-reflection block 904 having a height $H_2$ and width $W_2$ and third anti-reflection block 906 having a height $H_3$ and width $W_3$.

As illustrated, second and third anti-reflection blocks 904, 906 may be positioned along the optical waveguide 708 farther from a media facing side 706 of the magnetic head 902 than anti-reflection block 716.

The above mentioned optimization procedure of tuning various characteristics of the anti-reflection blocks may be generalized for embodiments having multiple anti-reflection blocks, e.g., as depicted in FIGS. 9A-9C. For example, each anti-reflection block 716, 904, 906 in general may have a different height $H_1$, $H_2$, $H_3$, respectively. Moreover, the blocks may be placed in a periodic fashion. However, the location of each block with respect to each other (e.g., Pad_$d_2$, Pad_$d_3$) and/or the NFT 704 (e.g., Pad_$d_1$) may be adjusted to provide the desired destructive interference, according to the desired embodiment, e.g., for fine tuning of the resulting system 900 performance. It should also be noted that the embodiments described herein enable nearly independent control of NFT optical light reflectance for various NFT designs, e.g., which may be used to achieve essentially reflectionless plasmonic and/or photonic components for HAMR and future photonic integrated circuits, as would be appreciated by one skilled in the art upon reading the present description.

Figure 10:
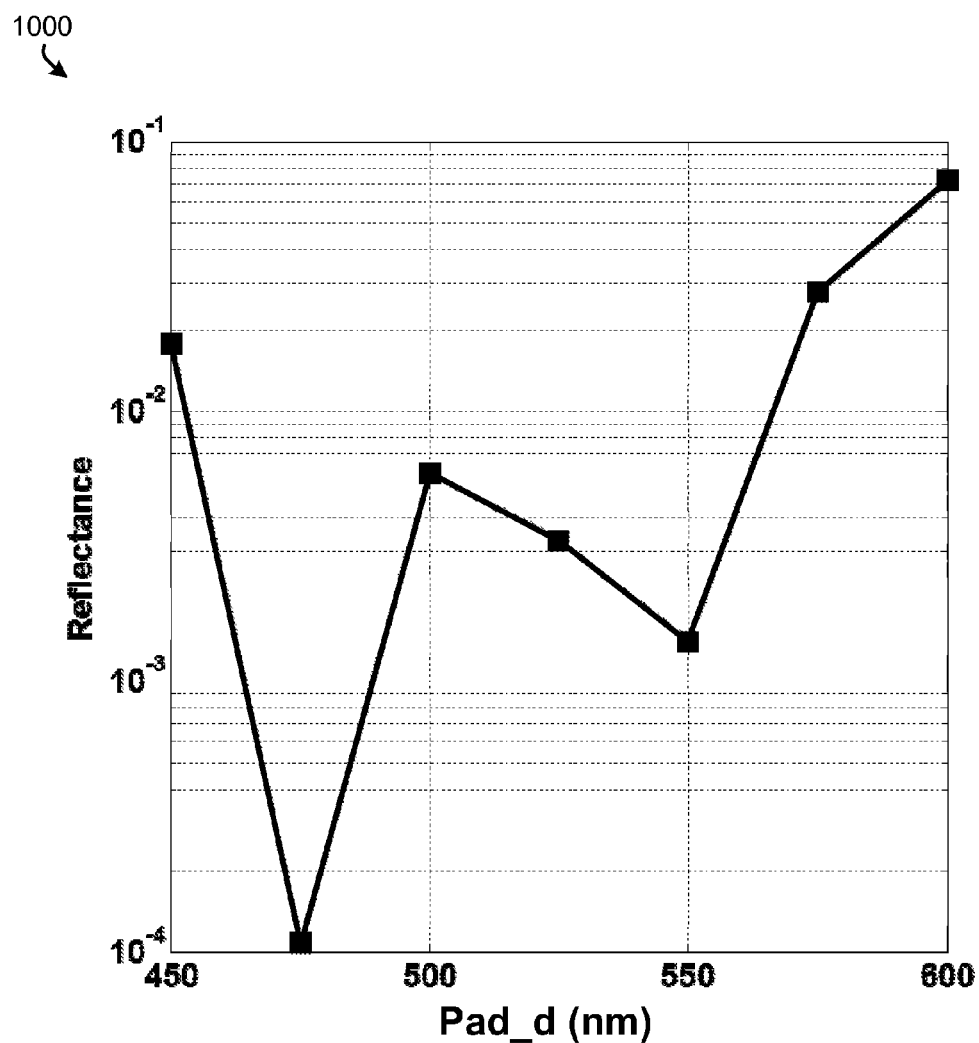
FIG. 10 is a graph illustrating reflectance vs. the distance separating two anti-reflection blocks from each other and an NFT from a closer one of the two anti-reflection blocks, according to one embodiment.

Referring momentarily to the embodiment of FIG. 10, graph 1000 illustrates the amount of optical light reflected back towards the optical light source resulting from modeling a particular embodiment having two anti-reflection blocks. The modeling performed in FIG. 10 resulted from assuming the characteristics of the two anti-reflection blocks were identical, while the distance Pad_d separating the two anti-reflection blocks as well as the distance separating the NFT and the closer of the two anti-reflection blocks was varied across the range of 450 nm to 600 nm. Graph 1000 illustrates that, in doing so, the percentage of reflected optical light affecting the optical light source can desirably be reduced to below 0.01% which corresponded to a distance Pad_d of about 475 nm. Again, the percentage of reflected optical light affecting the optical light source via the optical waveguide may be further reduced by implementing additional anti-reflection blocks (e.g., more than one, at least two, at least three, multiple, an array, etc.).

Referring still to FIGS. 9A-9C, although anti-reflection blocks 716, 904, 906 are illustrated in the present embodiment as having about the same characteristics, e.g., dimensions, spacing, etc., any one or more of the characteristics of anti-reflection blocks 716, 904, 906 may differ depending on the desired embodiment. As previously mentioned, characteristics of anti-reflection blocks and/or system parameters may be tuned during design, manufacture, etc. depending on the desired embodiment, e.g., to achieve an improved overall system performance, such as to achieve a desired amount of reflectance. Thus, characteristics of anti-reflection block 716, second anti-reflection block 904 and/or third anti-reflection block 906 may be tuned to reduce the amount of optical light reflected back towards the optical light source.

Moreover, as mentioned above, different numbers of anti-reflection blocks may be implemented as desired. Thus, according to various embodiments, a magnetic head may include two, at least three, at least four, at least five, multiple, an array, etc. of anti-reflection blocks positioned along the optical waveguide farther from a media facing side of the magnetic head than the NFT. The characteristics of any one or more of the anti-reflection blocks implemented in a given embodiment may be tuned to achieve the desired performance of the one or more blocks themselves and/or the system as a whole as would be appreciated by one skilled in the art upon reading the present description.

Further still, FIGS. 11A-11B illustrate partial cross-sectional views of a magnetic head 1102 in system 1100, in accordance with yet another embodiment. Specifically, FIGS. 11A-11B illustrate detailed views of a media facing side of a magnetic head 1102 in system 1100, in accordance with one embodiment. As an option, the present system 1100 may be implemented in conjunction with features from any other embodiment listed herein, such as those described with reference to the other FIGS., e.g., such as FIGS. 6-7C. Specifically, FIGS. 11A-11B illustrate variations of the embodiment of FIGS. 7A-7C depicting another exemplary configuration within the magnetic head 1102. Accordingly, various components of FIGS. 11A-11B have common numbering with those of FIGS. 7A-7C.

Of course, however, such system 1100 and others presented herein may be used in various applications and/or in permutations which may or may not be specifically described in the illustrative embodiments listed herein. Further, the system 1100 presented herein may be used in any desired environment.

It should be noted that the dimensions of the components illustrated in FIGS. 11A-11B may be exaggerated (e.g., larger and/or smaller than would typically be observed) relative to other components, which are in no way intended to limit the invention. Moreover, to simplify and clarify the structures presented, and spacing layers, insulating layers may be omitted from the subsequent figures and/or descriptions. Thus, although FIGS. 11A-11B illustrate illustrative views of a magnetic head 1102 in system 1100, additional and/or alternative layers and combinations of layers may be used in the structure as would be appreciated by one of ordinary skill in the relevant art upon reading the present disclosure, including insulating layers, adhesion layers, etc. In addition, any of the layers described in relation to system 1100 may be comprised of multiple layers, which may or may not be of the same material.

The magnetic head 1102 illustrated in FIGS. 11A-11B has an optical waveguide 708 and cladding layers 710, 712, 714 extending away from the media facing side 706. Moreover, anti-reflection block 1104 is positioned along the optical waveguide 708 farther from a media facing side 706 of the magnetic head 1102 than NFT 704, separated from the NFT 704 by a distance Pad_$d_4$. As mentioned above, a width $W_4$ of the anti-reflection block 1104 is greater than the width $W_{WG}$ of the optical waveguide 708.

In the present embodiment, two sensor leads 1106 extend from anti-reflection block 1104 on opposite ends thereof. The sensor leads 1106 are preferably connected to the anti-reflection block 1104 in a manner which permits an electric current to flow through at least a portion of the anti-reflection block 1104 when a voltage potential is applied across the sensor leads 1106. According to an exemplary embodiment, the sensor leads 1106 may include Ru with thickened Cu/Ta leads.

The sensor leads 1106 may be coupled to a controller (e.g., 129 of FIG. 1), preferably such that the controller is able to implement any one or more of the operations described herein. For example, in some approaches, the controller may be able to calculate a thermal reading based on a current passing through the anti-reflection block 1104, thereby allowing the anti-reflection block 1104 to function as an optical power monitor. The higher the optical power introduced to the waveguide by the optical source, the warmer the anti-reflection block 1104 becomes, e.g., due to absorption of light. The warmer the anti-reflection block 1104 becomes, the higher the resistance detected by the controller. The controller may be configured to translate the change in detected resistance into a measure of the optical power in the waveguide, e.g., using a table, known formula, etc.

According to one example, which is in no way intended to limit the invention, a gold anti-reflection block with height of about 70 nm may absorb about 1% of the optical waveguide power, which eventually increases the local temperature of the anti-reflection block, e.g., via Joule heating. The higher local temperature with respect to the ambient temperature may be detected through changes in electrical resistance of the anti-reflection block. However, anti-reflection block may include various other materials, e.g., depending on whether creating more heat and/or higher temperature is desired. Various other power monitoring and/or thermal sensor systems are described in detail in U.S. Pat. No. 9,047,926 which is herein incorporated by reference.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   a magnetic head having:
      a near field transducer;
      an optical waveguide for illumination of the near field transducer; and
      an anti-reflection block positioned along the optical waveguide farther from a media facing side of the magnetic head than the near field transducer,
   wherein the anti-reflection block is positioned a distance from the near field transducer to destructively interfere with light reflected away from the near field transducer.

2. The system as recited in claim 1, wherein the distance results in a near zero reflectance of light from the near field transducer in the waveguide of less than about 0.1% light reflectance.

3. The system as recited in claim 1, wherein the distance results in a near zero reflectance of light from the near field transducer in the waveguide of less than about 0.01% light reflectance.

4. The system as recited in claim 1, wherein the anti-reflection block is at least as wide as the optical waveguide in a crosstrack direction.

5. The system as recited in claim 4, wherein the width of the anti-reflection block is greater than the width of the optical waveguide in the crosstrack direction.

6. The system as recited in claim 1, comprising a second anti-reflection block positioned along the optical waveguide farther from a media facing side of the magnetic head than the anti-reflection block.

7. The system as recited in claim 6, comprising at least a third anti-reflection block positioned along the optical waveguide farther from a media facing side of the magnetic head than the second anti-reflection block.

8. The system as recited in claim 1, comprising leads extending from the anti-reflection block.

9. The system as recited in claim 1, wherein a height of the anti-reflection block in a height direction is less than about 200 nm.

10. The system as recited in claim 1, wherein the anti-reflection block is constructed of a same material as the near field transducer, wherein the material is characterized as providing an optical interference effect that creates the destructive interference with light reflected away from the near field transducer.

11. The system as recited in claim 1, wherein the anti-reflection block and the near field transducer have physical characteristics of being formed in a same deposition process.

12. A magnetic data storage system, comprising:
   at least one magnetic head as recited in claim 1;
   a magnetic medium;
   a drive mechanism for passing the magnetic medium over the at least one magnetic head; and
   a controller electrically coupled to the at least one magnetic head for controlling operation of the at least one magnetic head.

13. The system as recited in claim 12, comprising leads extending from the anti-reflection block, the leads being coupled to the controller, the controller being configured to calculate a thermal reading based on a current passing through the anti-reflection block.

14. A system, comprising:
   a magnetic head having:
      a near field transducer;
      an optical waveguide for illumination of the near field transducer; and
      an anti-reflection block positioned along the optical waveguide farther from a media facing side of the magnetic head than the near field transducer,
   wherein the anti-reflection block is positioned a distance from the near field transducer to destructively interfere with light reflected away from the near field transducer,
   wherein the distance results in a near zero reflectance of light from the near field transducer in the waveguide of less than about 0.1% light reflectance,
   wherein a height of the anti-reflection block in a height direction is less than about 200 nm.

15. The system as recited in claim 14, wherein the distance results in a near zero reflectance of light from the near field transducer in the waveguide of less than about 0.01% light reflectance.

16. The system as recited in claim 14, wherein the anti-reflection block is at least as wide as the optical waveguide in a crosstrack direction.

17. The system as recited in claim 14, comprising at least a second anti-reflection block positioned along the optical waveguide farther from a media facing side of the magnetic head than the anti-reflection block.

18. The system as recited in claim 14, wherein the anti-reflection block is constructed of a same material as the near field transducer.

19. A magnetic data storage system, comprising:
at least one magnetic head as recited in claim 14;
a magnetic medium;
a drive mechanism for passing the magnetic medium over the at least one magnetic head; and
a controller electrically coupled to the at least one magnetic head for controlling operation of the at least one magnetic head.

20. The system as recited in claim 19, comprising leads extending from the anti-reflection block, the leads being coupled to the controller, the controller being configured to calculate a thermal reading based on a current passing through the anti-reflection block.

* * * * *